US007614839B2

(12) United States Patent
Albrecht

(10) Patent No.: US 7,614,839 B2

(45) Date of Patent: Nov. 10, 2009

(54) DEVICE FOR JOINING ADDITIONAL PARTS TO A BOOK BLOCK SPINE

(75) Inventor: Manfred Albrecht, Luebbecke (DE)

(73) Assignee: Kolbus GmbH & Co. KG, Rahden (DE)

( * ) Notice: Subject to any disclaimer, the term of this patent is extended or adjusted under 35 U.S.C. 154(b) by 745 days.

(21) Appl. No.: 11/438,602

(22) Filed: May 22, 2006

(65) Prior Publication Data

US 2007/0031212 A1 Feb. 8, 2007

(30) Foreign Application Priority Data

Jun. 1, 2005 (DE) ....................... 10 2005 025 235

(51) Int. Cl.

*B42B 5/04* (2006.01)
*B42C 9/00* (2006.01)
*B65G 29/00* (2006.01)

(52) U.S. Cl. ........................... 412/36; 412/37; 198/614; 198/621.1

(58) Field of Classification Search ................. 198/604, 198/614, 621.1, 622; 270/32, 37, 58.07; 412/1, 8, 9, 33, 34, 36, 37

See application file for complete search history.

(56) References Cited

U.S. PATENT DOCUMENTS 373,353 A * 11/1887 Fowler et al. ................. 412/22
6,439,562 B1 * 8/2002 Cote et al. ............... 270/52.17

FOREIGN PATENT DOCUMENTS

DE OS 22 20 567 2/1973
GB 629003 1/1947

* cited by examiner

*Primary Examiner*—Dana Ross
*Assistant Examiner*—Pradeep C Battula
(74) *Attorney, Agent, or Firm*—Alix, Yale & Ristas, LLP

(57) ABSTRACT

The device comprises a delivery device (4-9) that delivers the additional part (2) into a delivery position (10) that is spaced apart from the book block spine (11*a*). The transfer device (13) comprises at least two holding elements (14*a, b*) that move in a reciprocating fashion and the cycles of which are phase-shifted relative to one another, wherein said holding elements move in different tracks (15*a, b*) that are offset relative to one another between the delivery position (10) and the book block spine (11*a*) and apply the delivered additional part (2) onto the book block spine (11*a*) after it was provided with glue. The holding elements (14*a, b*) carry out a reciprocating turning movement about a common axis (16), wherein the turning radius of at least one holding element is increased or decreased in the instant in which both holding elements (14*a, b*) pass one another.

19 Claims, 2 Drawing Sheets

DEVICE FOR JOINING ADDITIONAL PARTS TO A BOOK BLOCK SPINE

BACKGROUND OF THE INVENTION

The present invention pertains to a device for joining additional parts such as gauze, lining paper, a tube or the like to a book block spine.

Gauze strips, lining strips and/or tubes are glued onto a book block spine in a book production line in order to dimensionally stabilize adhesively bound, thread-sealed or thread-sewn book blocks. DE-OS 22 20 567 discloses a book binding device, in which glue is initially applied to the spine of the book blocks that are intermittently transported forward, wherein an open gauze and a lining material are subsequently applied in the next position. Gauze strips and lining strips of the required length are cut from material strips that are trimmed to a width that matches the book block height. A headband is respectively glued onto both edges of the lining material strip, wherein the bead-like thickening of the headband subsequently adjoins the head cut and the foot cut of the book block. The gauze strips and lining strips are successively placed onto the book block spine in one and the same position of the book block, wherein the lining strip is delivered to a location that is spaced apart from the book blocks and transferred by a suction table that turns in a reciprocating fashion.

In book production lines with high cycle rates, the additional parts are applied in separate stations, wherein the entire surface of the book block spine is provided with glue prior to each joining process. The gauze and lining stations are designed similarly and respectively equipped with devices for unwinding and cutting to size the material strips, wherein the cut-off material strips are delivered to a position that is spaced apart from the book block spine. In this position, the gauze strips are received by a rotatable gripper and the lining strips are received by a suction table. The respective strips are subsequently applied onto the book block spine. The lining strip with its headbands is also aligned relative to the book block in that a finger of the suction table that can be displaced parallel to its turning axis adjoins the head cut or foot cut. In the tubing station, the tubes of tubular design are stored in a magazine, from which the respective bottom tube is pushed into said delivery position. The transfer is subsequently realized with a suction table that turns in a reciprocating fashion analogous to the lining station.

In relation to the other functional steps, the application of the delivered additional parts by means of holding elements that carry out a reciprocating movement is a time-consuming process, and the reliable and flawless application of the additional parts decisively limits the cycle rate of the joining stations.

SUMMARY OF THE INVENTION

The present invention is based on the objective of developing a device for joining additional parts such as gauze, lining paper, a tube or the like to a book block spine in such a way that a reliable and flawless application of the additional parts is ensured and a high processing speed is achieved with a simple construction.

This objective is attained in a surprisingly simple fashion in that the transfer device comprises at least two reciprocating holding elements, the cycles of which are phase-shifted relative to one another, whereby the holding elements move in different tracks that are offset relative to one another between the delivery position and the book block spine such that the holding elements can pass one another without colliding.

However, the two end positions of the holding elements are respectively identical in the delivery position and on the book block spine. The transfer device according to the invention makes it possible to distinctly increase the capacity, with only one delivery device for the additional parts. The holding elements do not carry out a circular movement such that it is possible to utilize simple connections for pneumatic and electric supply and control lines.

In one preferred embodiment of the invention, the holding elements turn in a reciprocating fashion about a common axis, wherein the turning radius of at least one holding element is increased or decreased in the instant in which the two holding elements pass one another.

BRIEF DESCRIPTION OF THE DRAWING

One embodiment of the invention is described in greater detail below with reference to the accompanying drawing, in which.

DESCRIPTION OF THE PREFERRED EMBODIMENTS

Figure 1:
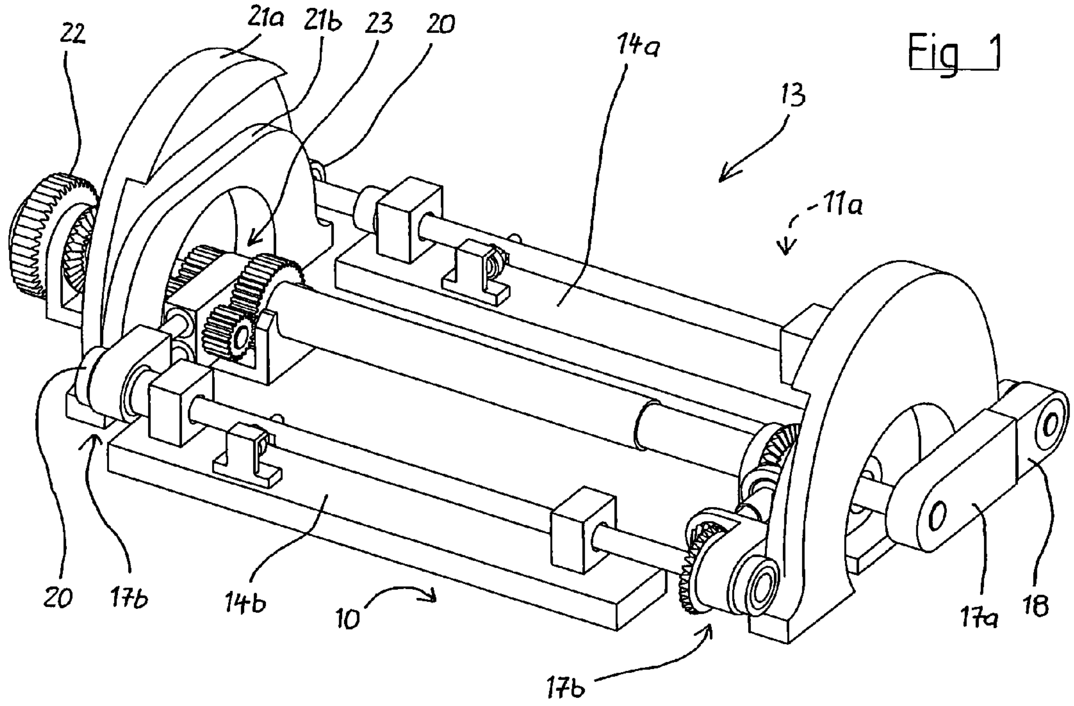
FIG. 1 is a perspective representation of a transfer device of a lining and headbanding station with suction tables that are situated in the reversing positions.
Figure 2:
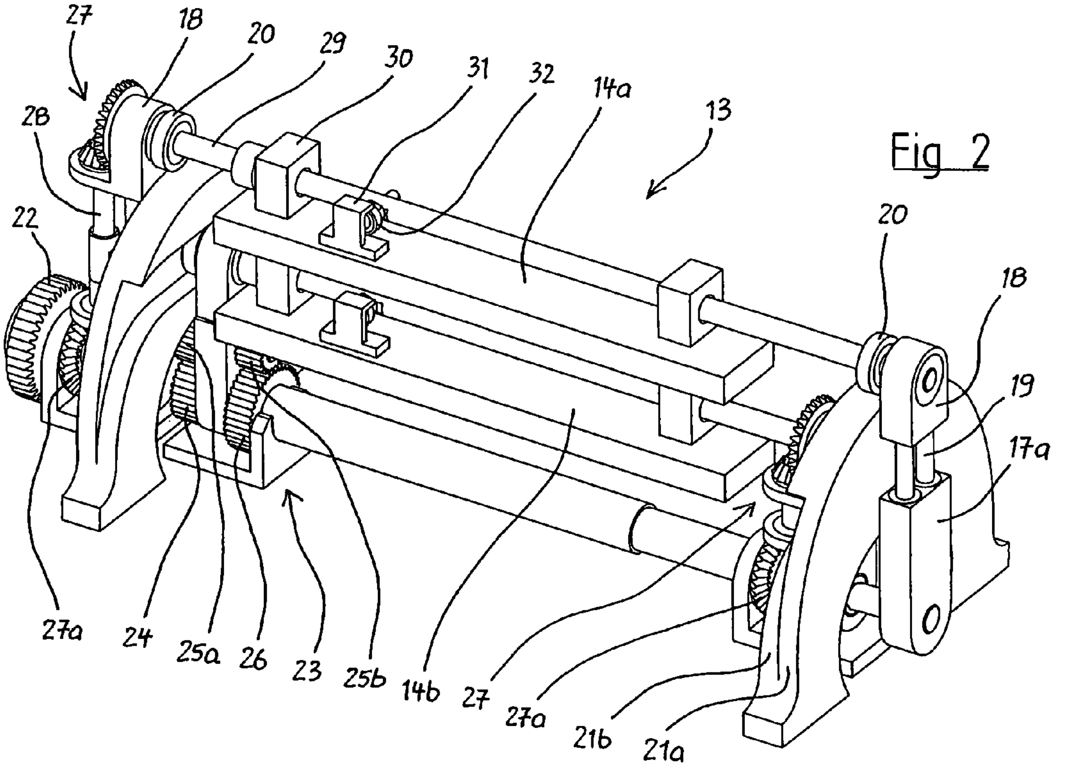
FIG. 2 shows the transfer device with passing suction tables in the form of a representation analogous to FIG. 1.

The transfer device 13 shown in the figures applies lining strips 2 delivered to a single delivery position 10 on a table 9 onto the book block spine 11*a* of a rounded and backed book block 11 that is held by clamping means 12 at a single target position, with glue having been applied onto the book block spine prior to the application of the lining strip. Although this description is made with respect to lining strips, it should be understood that the invention is applicable to other parts and that as used herein, "book part" includes gauze, lining paper, a tube or the like to be applied to a book block spine.

Figure 3:
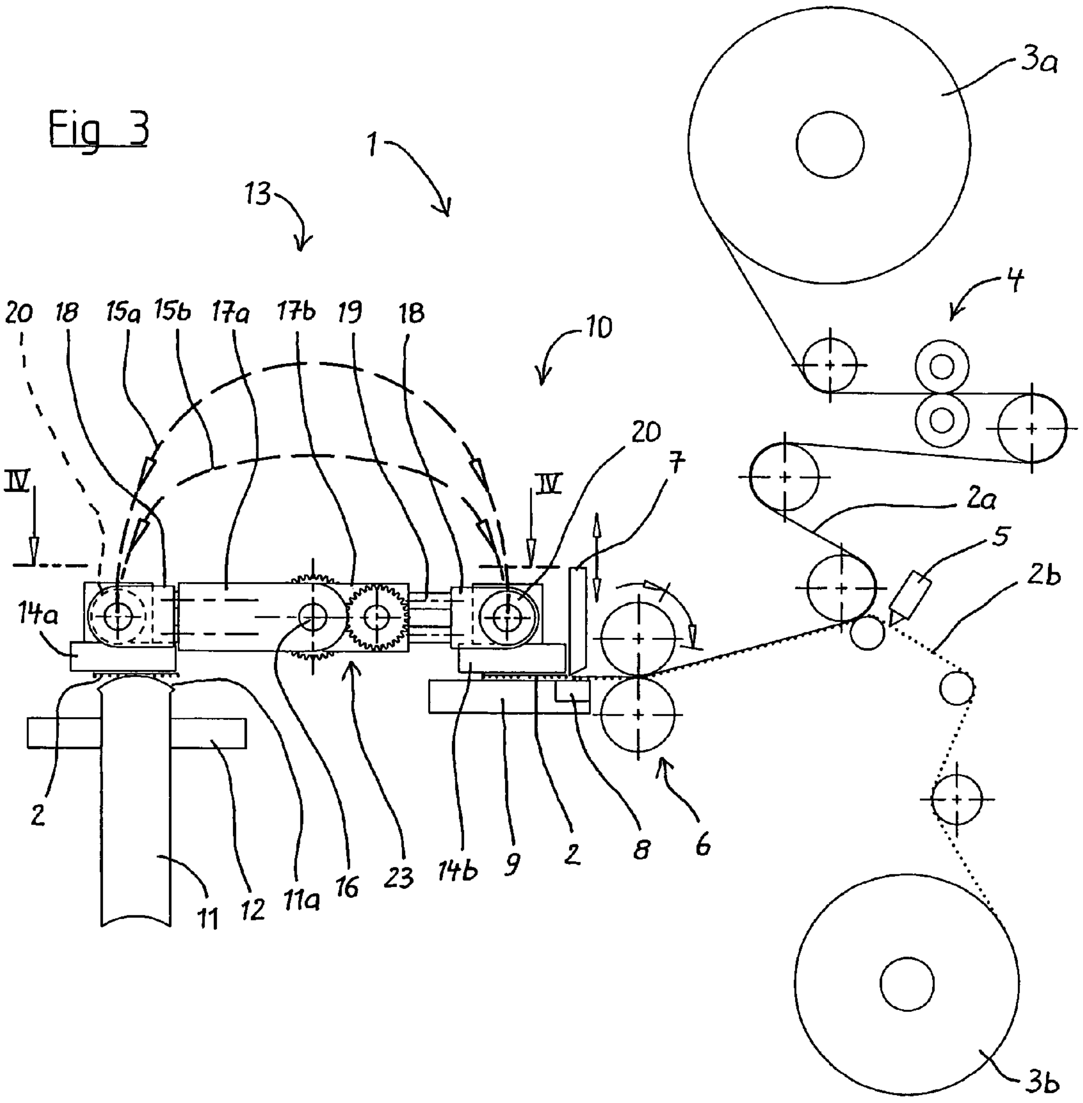
FIG. 3 is a schematic side view of the lining and headbanding station.
Figure 4:
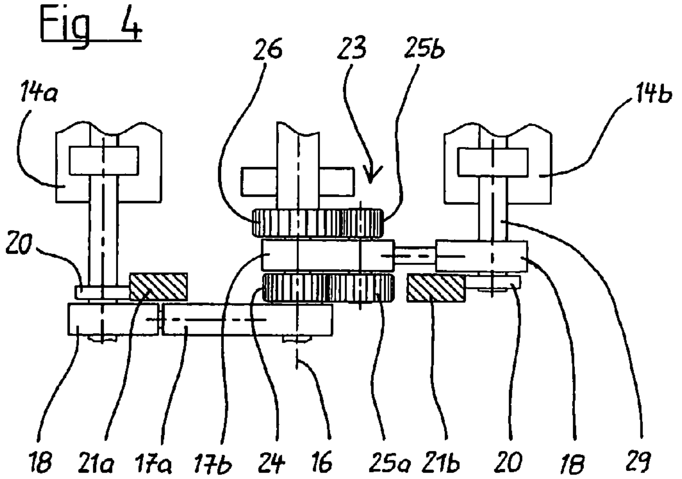
FIG. 4 is a detail of a top view of the transfer device as defined in FIG. 3.

According to FIG. 3, the lining strip 2 consists of a lining paper 2*a* that is unwound from a supply roll 3*a* and cut to a defined strip width by roll cutters 4, wherein one respective headband 2*b* that is unwound from a supply roll 3*b* and provided with glue by means of a glue nozzle 5 is glued onto the lining paper along both outer strip edges. A pair of take-off rollers 6 delivers a defined length of this paper strip to the table 9. An individual lining strip 2 is subsequently separated from the strip with a knife 7 that cooperates with a cutting bar 8.

The lining strip 2 is now transported to the book block spine 11*a* from the delivery position 10 on the table 9 and placed onto the book block spine by means of a suction table 14*a* or *b* that cyclically follows an arcuate path in a reciprocating fashion. According to the invention, two suction tables 14*a* and 14*b* are provided that turn about a common axis 16, wherein the two suction tables 14*a, b* move in different paths. The first suction table 14*a* moves in a first path 15*a*, with a turning radius from axis 16 which increases between the delivery position 10 and the book block spine 11*a*, wherein the second suction table 14*b* moves in a second path 15*b* with a decreasing turning radius. This makes it possible for both suction tables 14*a, b* to pass one another without colliding while the two end positions of both suction tables 14*a, b* are identical in the delivery position 10 and on the book block spine 11*a*. The suction tables 14*a, b* do not carry out a circulating movement such that, for example, the pneumatic supply of the suction tables 14*a, b* can be realized without a rotary lead-through.

In order to realize the aforementioned paths 15*a, b*, the suction tables 14*a, b* are accommodated in radially extendable receptacles 18 of swing arms 17*a, b*, wherein guide rollers 20 that respectively move on parabola-shaped radial cams 21*a* and *b* are arranged in the receptacles 18. The radial cams 21*a, b* may be realized in the form of cams with grooves or provide a contact surface on one side only as in the embodiment shown. The receptacles 18 that can be radially extended by means of push rods 19 are biased or prestressed by means of springs that are not illustrated in detail.

The turning movements of both suction tables 14*a, b* respectively take place in opposite directions (preferably 180 degrees out of phase) and are transmitted to the transfer device 13 by a single driving means that is not illustrated in detail via the driving wheel 22. The driving wheel 22 is connected to the first swing arm 17*a* in a rotationally rigid fashion while the second swing arm 17*b* is driven via an epicyclic gear 23 that is realized in the form of a positive gear.

The epicyclic gear 23 comprises a first wheel in the form of a gear 24 that is connected to the driving wheel 22 in a rotationally rigid fashion and engaged with a first planet wheel 25*a* on the swing arm 17*b* that is realized in the form of a fixed link. A second planet wheel 25*b* is connected to the first planet wheel 25*a* in a rotationally rigid fashion and engaged with a second wheel of the epicyclic gear, namely the gear 26 that is rigidly fixed on the frame. The corresponding selection of the number of teeth results in an output movement of the swing arm 17*b* that corresponds to a drive transmission ratio equal to −1.

In the embodiment shown, the suction tables 14*a, b* always move parallel to themselves, with the table 9 arranged horizontally in the starting point of the turning movement. The suction tables 14*a, b* respectively depend from an axle 29 that is held in the same rotational orientation as a bevel gear 27*a* rigidly connected to the frame by means of bevel gear arrangements 27. Due to the extendable receptacles 18, the respective bevel gear arrangements 27 are connected to one another by means of non-rotatable, but axially displaceable shafts 28.

The respective suction table 14*a* or *b* is supported in a rotationally displaceable fashion on the axle 29 by means of blocks 30. The aforementioned parallel motion is realized with a guide roller 82 that is mounted on the axle 29 and moves in a guide link 31 of the suction table 14*a* or *b*, respectively. The remaining degree of freedom of the axial mobility is conventionally utilized for aligning the suction table 14*a* or *b* relative to the book block 11, wherein the control means for this axial movement are not illustrated in detail in the figures.

The transfer device 13 according to the invention with the suction tables 14*a, b* that turn in a reciprocating fashion can also be used for placing tubes onto the book block spine 11*a*. Open gauze can be processed if the suction tables 14*a, b* are replaced with grippers, wherein a parallel motion is not absolutely imperative in this case.

The invention claimed is:

1. Apparatus for joining additional book parts to a book block spine, with a delivery device for delivering the additional part into a single delivery position that is spaced apart from the book block spine, and with a transfer device comprising a holding element that moves in a reciprocating fashion between said delivery position where the part is picked up and transferred to a single target position at the location of the book block spine and thereby applies the delivered additional part for gluing onto the book block spine, wherein the improvement comprises that:

the transfer device includes at least two holding elements that each move in a reciprocating, cyclic fashion in which the cycles are phase-shifted relative to one another; and said holding elements move in different paths that are offset relative to one another between said delivery position and said target position.

2. The apparatus according to claim 1, wherein each holding element follows an arcuate reciprocating path about a common axis, wherein the turning radius of the path of at least one holding element increases or decreases where the two holding elements pass one another.

3. The apparatus according to claim 2, wherein the at least one holding element is supported for movement along said path, at one end of an extendable swing arm.

4. The apparatus according to claim 3, wherein said one end of the extendable swing arm of said at least one holding element is guided by a radial cam.

5. The apparatus according to claim 4, wherein the radial cam is realized with a parabola shape.

6. The apparatus according to claim 5, wherein both holding elements follow an arcuate path and the turning radius of the path of the first holding element increases during movement between the end positions while the turning radius of the second path element decreases.

7. The apparatus according to claim 3, wherein both holding elements follow an arcuate path and the turning radius of the path of the first holding element increases during movement between the end positions while the turning radius of the second path element decreases.

8. The apparatus according to claim 4, wherein both holding elements follow an arcuate path and the turning radius of the path of the first holding element increases during movement between the end positions while the turning radius of the second path element decreases.

9. The apparatus according to claim 2, wherein both holding elements follow an arcuate path and the turning radius of the path of the first holding element increases during movement between the end positions while the turning radius of the second path element decreases.

10. The apparatus according to claim 9, wherein the holding elements comprise suction tables that are always parallel to themselves during said cyclical movement.

11. The apparatus according to claim 10, wherein the holding elements are respectively driven such that their movement is always in opposite directions.

12. The apparatus according to claim 2, wherein the holding elements comprise suction tables that are always parallel to themselves during said cyclical movement.

13. The apparatus according to claim 2, wherein the holding elements are driven by a single driving means.

14. The apparatus according to claim 13, wherein an epicyclic gear in the form of a positive gear is provided for converting the movement of the first holding element into an oppositely directed movement of the second holding element.

15. The apparatus according to claim 2, wherein an epicyclic gear in the form of a positive gear is provided for converting the movement of the first holding element into an oppositely directed movement of the second holding element.

16. The apparatus according to claim 1, wherein the holding elements comprise suction tables that are always parallel to themselves during said cyclical movement.

17. The apparatus according to claim 1, wherein the holding elements are respectively driven such that their movement is always in opposite directions.

18. The apparatus according to claim 17, wherein an epicyclic gear in the form of a positive gear is provided for converting the movement of the first holding element into an oppositely directed movement of the second holding element.

19. The apparatus according to claim 1, wherein the holding elements are driven by a single driving means.

* * * * *